United States Patent [19]

Sato

[11] 4,146,108
[45] Mar. 27, 1979

[54] BRAKING SYSTEM RESPONSIVE TO ABRUPT RELEASE OF ACCELERATOR PEDAL

[76] Inventor: Yasuo Sato, 11 Banchi, Kizukuri-cho, Gifu, Japan

[21] Appl. No.: 852,318

[22] Filed: Nov. 17, 1977

Related U.S. Application Data

[62] Division of Ser. No. 646,188, Jan. 2, 1976, abandoned.

[51] Int. Cl.² .......................................... B60K 41/20
[52] U.S. Cl. ............................. 180/103 BF; 188/163; 192/3 TR; 303/16
[58] Field of Search ......... 180/103 R, 103 BF, 105 R, 180/108; 192/3 TR; 188/163; 303/16

[56] References Cited

U.S. PATENT DOCUMENTS 3,763,975  10/1973  Fontaine ................. 180/103 BF UX

FOREIGN PATENT DOCUMENTS 2511020  9/1976  Fed. Rep. of Germany .... 180/103 BF

Primary Examiner—Joseph F. Peters, Jr.
Assistant Examiner—Michael Mar
Attorney, Agent, or Firm—George B. Oujevolk

[57] ABSTRACT

A braking system for an automobile responsive to the abrupt release of an accelerator pedal. The system includes a solenoid for actuating the braking apparatus, a first switch adapted to be closed in response to a depression of the accelerator pedal, so as to prepare for the energization of the solenoid, and a second switch adapted to be closed in response to an abrupt release of the accelerator pedal to allow the energization of the solenoid to bring the braking apparatus into effect. The first switch is opened when the accelerator pedal has returned to the original position, so as to de-energize the solenoid and suspend the operation of the braking apparatus. The braking apparatus is brought into effect again by a subsequent depression of the brake pedal. The braking system incorporates a brake force doubling mechanism for allowing the functioning of both of the solenoid-actuated operation and human-actuated operation, so arranged as to provide for the functioning of the braking apparatus by the solenoid in response to the driver's intent to stop the automibile and, then, the functioning of the braking apparatus in response to the depression of the brake pedal.

18 Claims, 14 Drawing Figures

BRAKING SYSTEM RESPONSIVE TO ABRUPT RELEASE OF ACCELERATOR PEDAL

BACKGROUND OF THE INVENTION

This application is a division of Serial No. 646,188 filed Jan. 2, 1976, 1 now abandoned and the invention of this application relates to a braking system of automobile capable of shortening the stop distance without losing the steering stability.

According to the conventional braking systems, it takes about 0.75 to 1 seconds, for the brake to come to effect, after the driver has commenced the braking operation. The automobile is allowed to run during this period, against the driver's will, to travel a distance corresponding to the cruising speed, often resulting in a serious accidents. More specifically, in ordinary automobiles, an accelerator pedal and a brake pedal are arranged in parallel with each other, on the floor in front of the driver's seat. Thus, an unexpectedly long time elapses until the brake pedal is depressed, after the driver's foot has left the accelerator pedal, which has inconveniently elongated the stop distance of the automobile. However, this fact has been rather out of consideration.

It is therefore an object of the invention to provide a braking system capable of starting the braking function at an early stage at which the conventional braking systems could not function.

Another object of the invention is to provide a braking system capable of interrupting the braking, prior to the braking by the brake pedal, so as not to deteriorate the steering stability.

Usually, drivers do not release the accelerator pedal, during the normal cruising. At the same time, it is believed that no driver would gradually release the accelerator pedal, nor would try to depress the brake pedal with his heel placed on the floor, so far as he intends a sudden stop.

Thus, the departure of the driver's heel from the floor can be regarded as a trigger for the operation of the braking system. Although this can considerably shorten the idle time before the effecting of the brake and, accordingly, the stop distance, the maneuvering or driving feeling is affected to deterorate the steering stability.

Therefore, the invention aims at interrupting the braking, so as to ensure a good steering stability.

SUMMARY OF THE INVENTION

To this end, the braking system according to the invention is provided with a first switch associated with the accelerator pedal such that it is closed as the pedal is depressed, so as to prepare for supplying a solenoid coil with electric current, and a second switch so associated with the accelerator pedal as to be closed when the pedal is abruptly released.

The arrangement is such that the circuit for the solenoid coil is completed when both of the first and the second switches are closed to bring the braking system into effect to stop the automobile. In addition, the first switch is adapted to be opened, when the accelerator pedal has returned to the non-depressed position, so as to interrupt the power supply to the solenoid coil, thereby to suspend the braking effect temporarily. The braking is restarted by a subsequent depression of the brake pedal, for stopping the automobile in the ordinary manner. The braking system as summarized above is actuated by a brake force doubling mechanism or a booster as disclosed in the specification of Application Ser. No. 646,188.

These and other objects, as well as advantageous features of the invention will become clear from the following description of preferred embodiments taken in conjunction with the attached drawings in which:

DESCRIPTION OF THE PREFERRED EMBODIMENTS

Figure 1:
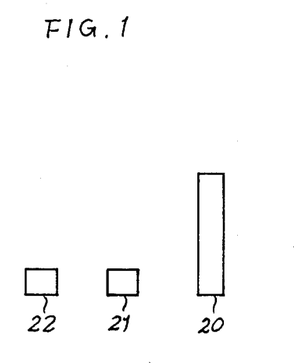
FIG. 1 is a schematic plan view of a pedal arrangement on the floor in front of the driver's seat of an ordinary automobile.
Figure 2:
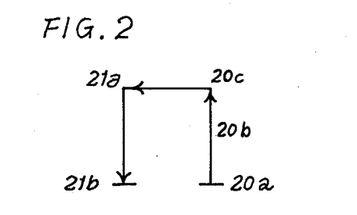
FIG. 2 is a diagrammatic representation of steps by which the driver's foot is shifted from accelerator pedal to the brake pedal.

Referring at first to FIGS. 1 and 2, an ordinary automobile has an acceleration pedal 20, a brake pedal 21 and a clutch pedal 22 which are arranged side by side on the floor of the automobile in front of the driver's seat. In braking, the driver's foot which has been placed on a point 20a supposed on the accelerator pedal 20 is moved, via points 20b and 20c, to a point 21a supposed on the brake pedal 21, for depressing the latter. The brake comes into effect at a point 21b.

Figure 3:
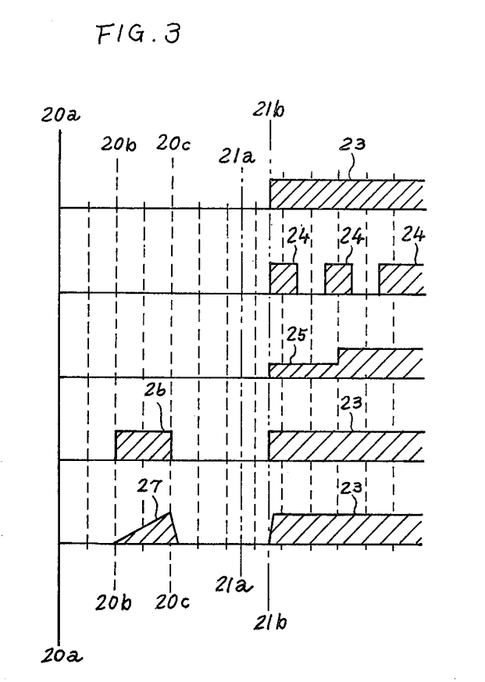
FIG. 3 is a graph representing the timing of operation of the brake system at axis of abscissa and braking force at axis of oedinate for five kinds of braking operations, including conventional ones for the purpose of comparison.

According to data which have been publicly known, it takes 0.4 second for the foot to move from 20a to 20c, and 0.25 second from 20c to 21a, and additional 0.1 second is necessary for the foot to move from 21a to 21b. Thus, 0.75 second is required for bringing the brake into effect. FIG. 3 shows the above stated procedure of the braking operation. In FIG. 3 axis of abscissa represents the time elapsed graduated by 0.1 second, while axis of ordinate represents the obtained braking force. It will be seen that the brake comes into effect at the point 21b, 0.75 second after the brake demanding point 20a, as denoted by numeral 23. The wheels of the automobile are then locked to stop the automobile after a certain slip.

Therefore, in order to avoid uncontrolled condition of the automobile due to the slip, those skilled in driving operate the brake bit by bit or little by little, as denoted by 24 . . . 24, or slightly operate the brake until the automobile is decelerated to a certain speed, as denoted by 25, and then strongly operate the brake.

No matter how drivers may operate the brake skillfully, the automobiles are allowed to run, against their will, during the period of 0.75 second until the point 21 has been reached, often resulting in a serious accident.

Under this circumstance, the present inventors have proposed to initiate the braking effect at an early stage of point 21b, and to suspend the braking effect at the point 20c, so as not to deteriorate the steering stability. Then, the braking is succeeded by an ordinary human-controlled braking system to perform the braking as at 23.

Figure 4:
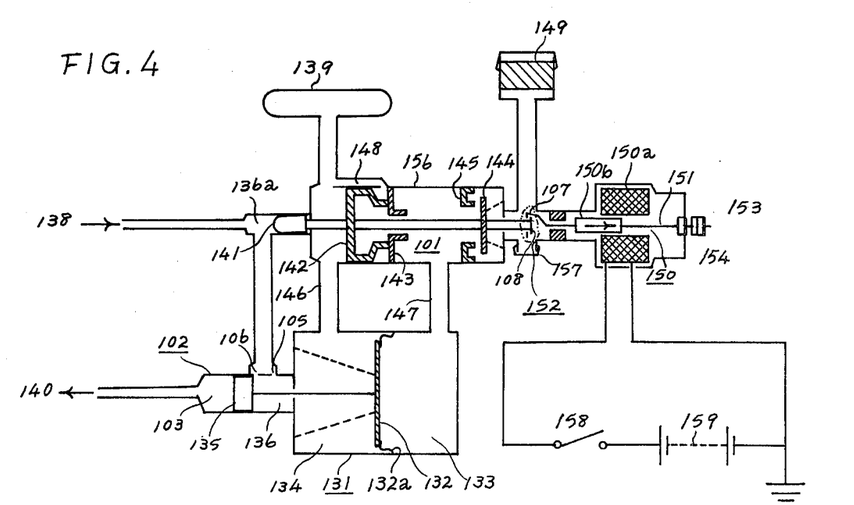
FIG. 4 is a schematic sectional view of a brake force doubling mechanism (hereinafter, referred to as "first doubling mechanism") as shown in the specification of Ser. No. 646,188 of the present inventors, in the operating condition.

Referring now to FIG. 4, the system in accordance with the invention has closed cylinders consisting of a large chamber and a small chamber. A cylinder body 131 defining the larger chamber has a diaphragm 132a fixed to the inner wall thereof and a power piston 132 fixed to the diaphragm. The diaphragm 132a and the power piston 132 divides the space in the cylinder body 131 into two sections of a controlling chamber 133 and a vacuum chamber 134. The vacuum chamber 134 is connected to a vacuum source which may be the intake manifold 139 of the engine. Normally, the controlling chamber 133 and the vacuum chamber 134 are in communication with each other through a relay valve 101, so that the controlling chamber 133 is also kept at a vacuum, and the controlling chamber 133 is selectively brought into communication with atmosphere by the switching of the relay valve 101. A return spring is provided for biasing the power piston 132, in the direction to reduce the volume of the controlling chamber 133.

A hydraulic cylinder 102 constituting the aforementioned small chamber is connected to the cylinder body 131 at one side thereof where the vacuum chamber 134 is provided. The hydraulic cylinder 102 slidably accomodates a hydraulic piston 135 which is connected to the power piston 132. The hydraulic piston 135 divides the space in the small chamber into a hydraulic controlling chamber 136 and a high pressure chamber 103.

A wheel cylinder 104 for the braking device 140 is connected to the high pressure chamber 103. In the wall of the small chamber, there are formed an intake port 105 at a portion close to the power 132, and a return port 106 at a portion remote from the power piston 132. A relay control chamber 136a is connected to the portion of the small chamber where these ports 105 and 106 are formed. The relay control chamber 136a is connected further to a master cylinder 138 and a brake pedal 21.

In the normal condition, the hydraulic piston 135 is located between the intake port 105 and the return port 106, so that the hydraulic controlling chamber 136 and the high pressure chamber 103 are brought into communication with each other through the intake port 105 and the return port 106. However, in the braking condition, the hydraulic piston 135 is moved beyond the return port 106 toward the high pressure chamber 103, so as to interrupt the mutual communication of the hydraulic controlling chamber 136 and the high pressure chamber 103.

The relay valve 101 consists of a cylinder having a second large chamber and a second small chamber connected to each other, and pistons housed by these chambers. The head of a valve piston 141 is slidably received by the relay control chamber 136a which constitutes the second small chamber. The valve piston 141 has a neck and body portions which are designed and intalled to pass through the second large chamber. The neck portion of the valve piston 141 is provided with a vacuum valve 142, while an atmospheric valve 144 is fixed to the body portion of the valve piston 141.

A valve seat 143 is formed in the second large chamber constituted by a relay valve cylinder 156, so as to be engaged by the vacuum valve 142, in accordance with the movement of the valve piston 141. The relay valve cylinder further has a valve seat 145 formed therein, to which the atmospheric valve 44 is pressed when the valve piston 141 is in the suspending condition. The vacuum chamber 134 is communicated with the relay valve 101 through a conduit or a vacuum pipe 146, while a controlling pipe 147 is provided for bringing the controlling chamber 133 into communication with the relay valve 101. A relay passage 148 is adapted to be opened and closed by means of the vacuum valve 142 and the valve seat 143.

A solenoid 150 has a coil 150a and a core 150b adapted to be moved in the direction of the arrow when energized. An operating rod 151 fixed to the solenoid core 150b is connected at its one end, through a loose coupling 152, to the end of the valve piston 141, and at its other end to a stopper nut provided at the outside of the cylinder. The stopper nut 153 limits the stroke of the core 150b, and is effective also to prevent the core from being moved in an uncontrolled manner by the return spring. A restricting nut 154 is fitted to the end portion of the operating rod 151, within the cylinder, and is fixed thereto after an adjustment.

Since the volume of air supplied to controlling chamber 133, for the purpose of braking, is the multiple of the flow rate of the air by a unit time and the time until the required air volume is attained in the controlling chamber, the braking effect is gradually increased as denoted by 27 in FIG. 3, if the gap between the atmospheric valve 144 and its associated valve seat 145 is limited to small. It will be seen that an optimum response characteristic of the brake system is obtained by suitably adjusting and fixing the restricting nut 154, so as to provide an appropriate lift of the atmospheric valve 144 above the valve seat 145.

The loose coupling 152 may be constituted by a combination of a cylinder-like coupling housing 107 having a slide bore and a piston-like slide member 108 slidably received by the housing 107. More specifically, as the coil 150a is energized by the current supplied from a power source 159, upon closing of a switch 158, the slide member 108 is locked by the housing 107, so as to attract the valve piston 141, i.e. the braking is triggered by the solenoid 150, and the stroke of the solenoid is limited by the restricting nut 154. The coupling housing 107 is not moved when the valve piston 141 is actuated by the depression of the brake pedal 21, so as to allow the sliding relative movement of the slide member 108 therein. At the same time, when the valve piston returns due to the suspension of the braking, the coupling housing 107 is not moved, allowing the sliding relative movement of the slide member 108.

Therefore, the mutual interference of the braking by the brake pedal 21 and the braking caused by the solenoid 150 is fairly avoided. Namely, the play of the loose coupling is effective to prevent the braking by the brake pedal from affecting the braking by the solenoid 150, even when the brake pedal 21 is operated during the operation of the braking system by the solenoid 150, or before or after the latter. Rather, the braking effect is multiplied to cause a larger braking force.

The invention makes use of the above described apparatus. As the human-actuated brake pedal is depressed, a pressure of a magnitude depending on the displacement of the brake pedal is generated in the relay control chamber 136a, and the pressure in the hydraulic control chamber 136 is changed accordingly. Consequently, the displacements of the valve piston 141 and the hydraulic piston 135 are caused in proportion to the pressure, so as to provide different clearance between the atmospheric valve 144 and the valve seat 145, thereby to vary the flow rate of the air into the controlling chamber 133. Then, in accordance with the movement of the atmospheric valve 144, the vacuum valve 142 is pressed onto the valve seat 143, so as to disconnect the relay passage 148 from the control pipe 147. Consequently, the controlling chamber 133 is disconnected from the intake manifold 139, and is brought into communication with the atmosphere, through the control pipe 147 and an air cleaner 149, so as to be supplied with the ambient air. Since the pressure in the controlling chamber is increased, while the vacuum chamber 134 is still kept at a vacuum, the power piston 132 is moved to rapidly expand the controlling chamber 133, so as to cause a braking more efficiently than the braking effected solely by the brake pedal 21.

As the pressure in the relay control chamber 136a is released, the vacuum valve 142 is allowed to clear the valve seat 143, while the atmospheric valve 144 comes to be pressed onto the valve seat 145, so that the air in the controlling chamber 133 is sucked by the intake manifold vacuum, through the controlling pipe 147 and the relay passage 148. Consequently, the power piston 132 is retracted to release the brake.

The combinations of the vacuum valve 142 and the valve seat 143, and of the atmodpheric valve 144 and the valve seat 145 can be considered as a switch for selectively bringing the control pipe 147 into communication with intake manifold 139 or atmosphere. Therefore, for the purpose of clarification, these valves and valve seats are illustrated as a single relay valve piston 130, in FIGS. 5 to 14.

Figure 5:
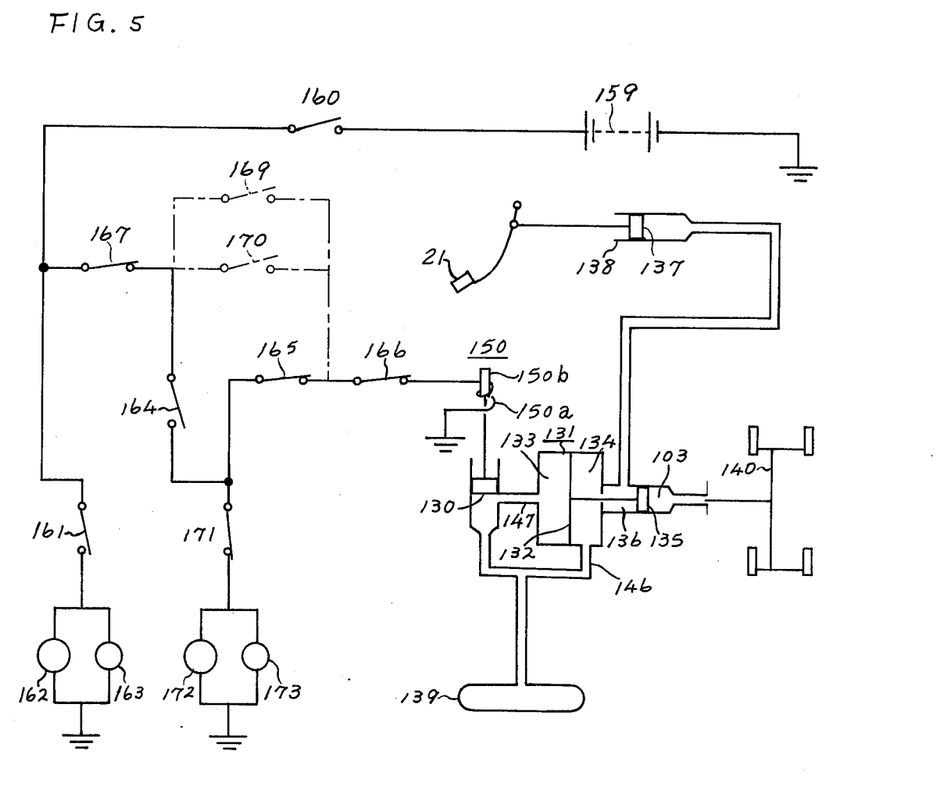
FIG. 5 is a diagrammatic representation of an embodiment of the invention in a suspended condition.

Referring now to FIG. 5 showing an embodiment of the braking system, a switch 160 for the starter circuit is installed on the dash board of the automobile. A switch 161 is adapted to be closed when the brake pedal 21 is depressed, so as to close the circuit including a source 159 and stop lamps 162 provided at the rear of the automobile, as well as an indicator lamp 163 installed on the dash board, thereby to put these lamps on, as known per se.

A detecting switch 164 is adapted to be closed when the accelerator pedal 20 is abruptly released or returned, instantaneously or by a certain time lag. An interrupting switch 165 connected in series to the detecting switch 164 is adapted to be closed when the accelerator pedal 20 is depressed and to be opened when the accelerator pedal has been returned almost to the non-sepressed position. A dismissal switch 166 is adapted to be opened when the clutch pedal 22 is depressed and closed upon returning of the clutch pedal, while a change-over switch 167 is adapted to be opened when a hand brake is tightened, and closed when the latter is released.

In an automobile having a torque converter, the dismissal switch 166 can be dispensed with and the switches associated with the accelerator pedal can be substituted by a mat switch which is opened when pressed by foot, in automobile equipped with an overdrive mechanism.

Alternatively, the switches associated with the accelerator pedal can be replaced with a manual switch 169 provided on the steering wheel, or a manual switch 170 installed on the dash board.

The detecting switch 164 may be constituted by a switch capable of detecting the driver falling asleep, hazard or danger ahead of the automobile, or other switch adapted to be operated in accordance with the driver's will to stop the automobile, or by a combination of these switches.

The automobile provided with the above described braking system of the invention can be operated substantially in the same manner as the conventional automobiles. Namely, during the operation of the engine, the engine switch 160 is closed. The interrupting switch 165, change-over switch 167 and the dismissal switch 166 are closed, while the detecting switch 164 and the braking switch 161 are opened, so that the coil 150a and the stop lamps are not supplied with electric power, as far as the automobile cruises in the normal condition. However, when the accelerator pedal 20 is abruptly released, for abruptly decelerating or braking the automobile, the detecting switch 164 is closed to allow the energization of the solenoid coil 150a, so that the braking apparatus 140 is brought into effect. Soon thereafter, the accelerator pedal 20 is returned to the non-depressed position, so as to open the interrupting switch 165, so that the braking function is suspended for a period corresponding to the interval between the points 20c and 21b in FIG. 3. Then, by a subsequent depression of the brake pedal 21, the brake switch 161 is closed to put the brake lamp 162 and the brake indication lamp 163 on, and the push rod 137 is displaced to actuate the braking apparatus 140 of the automobile. Consequently, the braking apparatus 140 exerts a braking force corresponding to the force exerted on the brake pedal 21 by the driver's foot.

Then, as the brake pedal 21 is released, after the deceleration or braking to the desired speed, the brake switch 161 is opened to put the stop lamp 162 and the stop indication lamp 163 off. The automobile comes to resume the normal running condition, as the accelerator pedal 20 is depressed again to open the detecting switch 164 and to close the interrupting switch 165.

It will be clear to those skilled in the art that no braking effort is performed when the clutch pedal 22 is depressed for coasting or other purposes, even when the accelerator pedal 20 is released, because the dismissal switch 166 is opened to interrupt the current supply to the coil 150a, although the detecting switch 164 is closed.

As will be seen from the foregoing description, according to the invention, a braking is performed by the use of intake vacuum, through a displacement of a relay valve piston 130, caused by the energization of the coil 150a of the solenoid 150, in addition to the conventional or ordinary braking operation initiated by the brake pedal 21. In addition, according to the invention, the braking effect is brought about at an early stage at which the accelerator pedal is released, in good contrast to the conventional system in which at least 0.75 to 1 second is necessary for the brake to come into effect. This initial braking is continued for a period until the accelerator pedal is returned to the non-depressed position, and can contribute to considerably shorten the stop distance, due to the early operation which cannot be expected from the conventional braking system.

Further, since this initial braking assists the effect of the engine brake, the automobile has been decelerated considerably, by the time when the brake pedal comes to be depressed, which advantageously contribute to avoid the danger due to a sudden braking.

In addition, since the initial braking has been suspended when the brake pedal is depressed, the braking effect is exerted in two steps, thereby to preserve a good steering stability, even in case of the sudden stop.

If necessary, parts 171, 172 and 173 may be provided additionally to the aforementioned structure. Namely, a warning switch 171 is associated with the brake pedal 21, so as to be opened when the brake pedal 21 is depressed, and closed when the pedal is returned. Series warning lamps 172 and 173 are installed at the rear of the automobile and on the dash board, respectively.

Thus, when the hand brake is released to turn the change-over switch 167 on and the engine switch 160 is closed, these warning lamps are never put on, as far as the accelerator pedal 20 is in the depressed condition. These lamps are turned on, however, after the accelerator pedal 20 is released, until the brake pedal 21 is depressed.

Therefore, the automobiles running after the automobile provided with the braking system of the invention can be informed of the deceleration, when the accelerator pedal is released for a sudden stop or deceleration, by means of the warning lamp, before the stop lamps are put on, so as to avoid the rear end collision.

Namely, referring to the braking phase denoted by 26 or 27 in FIG. 3, supposing that the speed of the automobile just before the braking is 40 Km/h, the automobile would travel about 8.25 m in 0.75 second until the stop lamps 162 are put on, in conventional braking system. However, according to the invention, the warning lamp 172 is put on, 0.2 second after the release of the accelerator pedal, in which the automobile runs only 2.2 m, and the stop lamps 162 are put on, insteadly of the warning lamp 172, 0.55 second thereafter. This means than the minimum allowable distance between the automobiles can be reduced to about a quarter.

Figure 6:
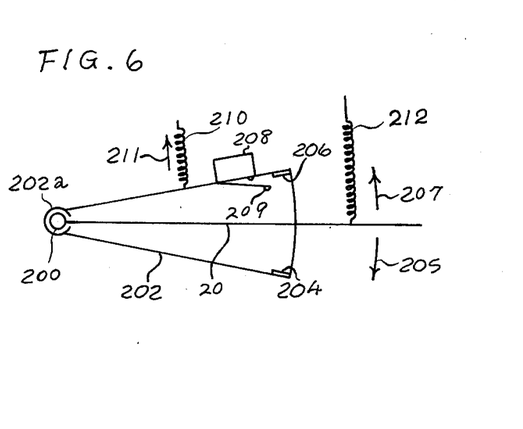
FIG. 6 is a side elevational view of a detecting switch incorporated in the embodiment as shown in FIG. 5.
Figure 7:
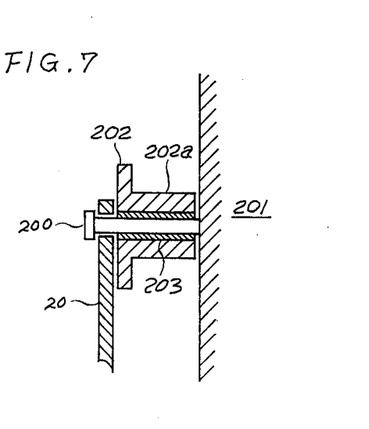
FIG. 7 is a sectional view of an essential part of a bearing incorporated in the switch of FIG. 6, and FIGS. 8 to 14 are diagrammatic representations of different embodiments of the invention in suspending condition.

Hereinafter, a most simple example of the detecting switch will be described with specific reference to FIGS. 6 and 7. A shaft 200 has one end fixed to a vehicle body 201 and the other end in the form of an enlarged head. The shaft 200 carries rotatably at its intermediate section, an end of the accelerator pedal 20 and a fixture portion 202a of the switch attaching member or a damper plate 202.

The space between the shaft 200 and the fixture portion 202a is filled with silicon oil of a high viscosity. A projection 204 is adapted to engage the accelerator pedal 20 when the latter is rotated for acceleration in the direction of the arrow 205, for rotating the damping plate 202 in the direction of the arrow 205. Another projection 206 is adapted to engage the accelerator pedal 20 when the latter is rotated in the direction of the arrow 207, so as to cause a rotation of the damping plate 202 in the direction of the arrow 207. A switch 208 is brought into operation when its tongue 209 is pressed by the accelerator pedal 20.

The damping plate 202 is normally biased by a spring 210 in the direction of the arrow 211, while the accelerator pedal 20 is biased by a spring 212 in the direction of the arrow 207. Thus, in the normal cruising condition, the accelerator pedal is rotated in the direction of the arrow 205 to press the projection 204, so that the damping plate 202 is also rotated in the direction of the arrow 205.

For the deceleration, the accelerator pedal is gently or gradually rotated in the direction of the arrow 207, so that the damping plate 202 is also rotated in the same direction.

However, when the driver intends to stop the automobile suddenly, the accelerator pedal 20 is quickly returned in the direction of the arrow 207, while the damping plate 202 is allowed to return only at a slow speed. Therefore, the accelerator pedal 20 returns inadvance to the returning of the damping plate 202, so as to press the tongue 209, as well as the projection 206.

It will be seen that the switch 208 is not operated in the normal gentle deceleration, but is operated only when the driver turns to a sudden stop. Therefore, the described assembly is suitable for use as the aforementioned detecting switch.

Figure 8:
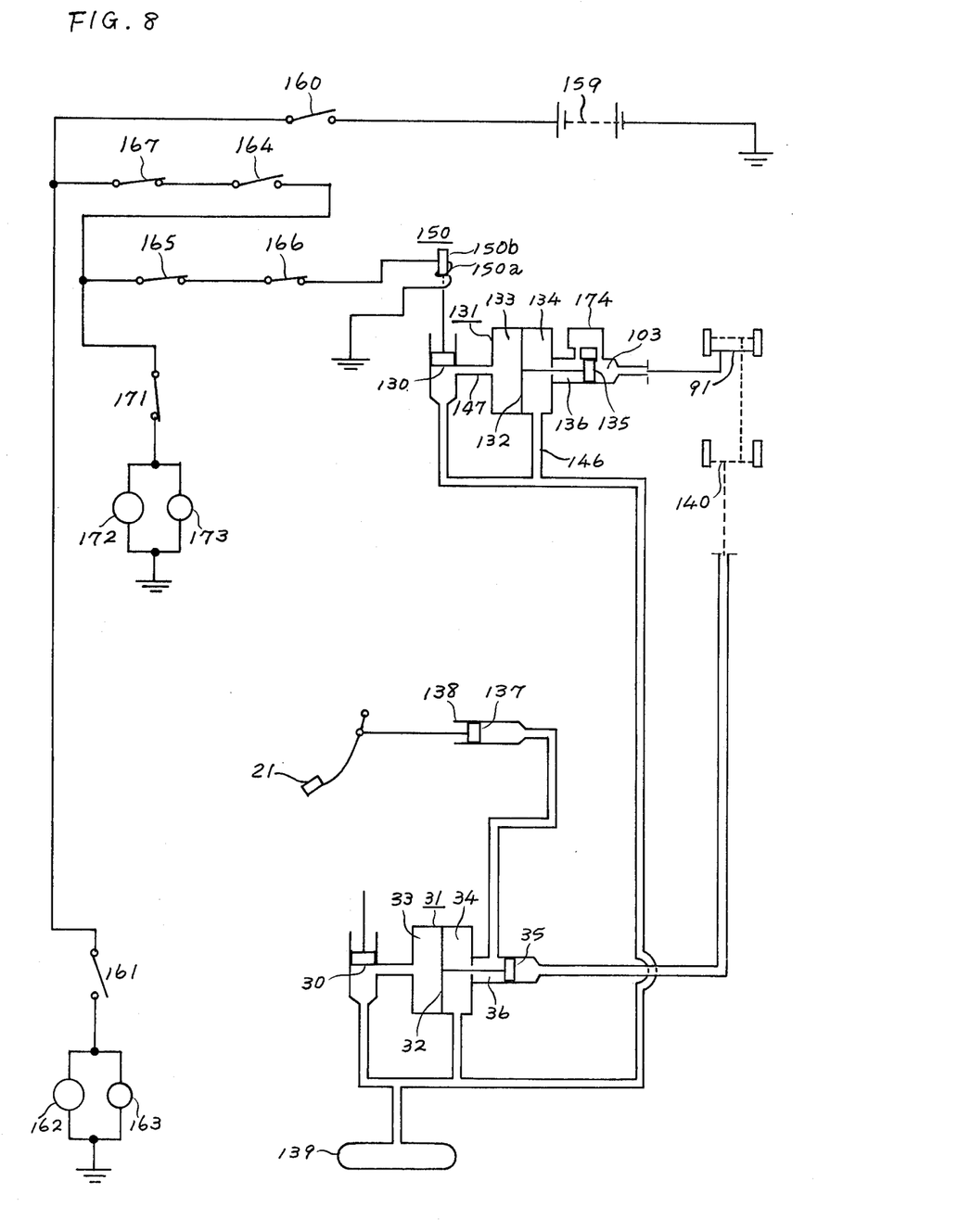

FIG. 8 shows another embodiment of the invention. This embodiment is similar to the first embodiment, excepting the portion illustrated at the right-hand side lower portion of Figure, but the master cylinder 138, push rod 137 and the brake pedal 21 are abolished from the construction of FIG. 5. Numeral 140 denotes the braking apparatus for all wheels, while a second braking apparatus for non-driving wheels is denoted by numeral 91. A reserve tank is designated at 174. Portions corresponding to those of FIG. 5 are denoted by same reference numerals. A second brake force doubling mechanism illustrated at the right-hand side lower portion of FIG. 8 has portions corresponding to those of FIG. 5, which bear corresponding reference numerals of 30 to 36 and referred to as the same titles but having annex of "second."

This embodiment can function in the same manner during the normal running and after the stopping of the automobile, but in a quite different manner from that of FIG. 5, during the braking.

More specifically, when the accelerator pedal 20 is returned abruptly, the detecting switch 164 is closed to actuate the first doubling mechanism which is illustrated at the upper portion of FIG. 8. Accordingly, the second braking apparatus is actuated and the warning lamp 172 and the warning indication lamp 173 are put on.

Then, the operation of the second braking device is suspended when the accelerator pedal 20 has been returned to the non-depressed position. The warning lamps are put off by the subsequent depressing of the brake pedal 21 and the stop lamp 162 and the stop indication lamp 163 are put on insteadly. At the same time, the second relay valve piston 30 is depressed downwardly as viewed on Figure, so that the second power piston 32 is pressed. By an application of a pressure to the second hydraulic controlling chamber 36 by means of the braking pedal, and by the second power piston 32, the brake apparatus 140 for all wheels comes to exert a braking force of a magnitude corresponding to the pressure applied to the brake pedal.

As the braking is ceased for continueing the cruise, the braking apparatus 140 for all wheels are released. At the same time, the interrupting switch 165 is closed, while the detecting switch 164 is opened, so that the first doubling mechanism as illustrated at the upper portion of the Figure is turned into the stand-by condition.

Conventionally, the following penomena have been known as causing a deterioration of the braking effect.

These phenomena are:

(1) When the driver turns to the braking operation, the engine braking effect is exerted only on the driving wheels, while other wheels are kept unbraked, so that the driving wheels and other wheels have different amounts of energy; and (2) A displacement of the centroid or weight center is caused by the braking, so that the front wheels and the rear wheels come to bear a larger and smaller weights, respectively, than before the braking. Consequently, the rear wheels are somewhat floated, causing a posture of automobile as referred to as "nose dive."

The phenomenon of above item 1 can be observed by a large difference in the revolution speeds of the front and rear wheels on an icy road and the like condition. Even in the usual public road, the same phenomenon can be observed when the road is rendered slippy, by rain, snow, sand or gravel. Consequently, in automobiles having rear driving wheels, the automobile body is apt to move ahead because of the unbraked front wheels. Then, the rear wheels to which the engine braking force is applied are pulled by the large mass of the automobile body, rather than decelerating the automobile, so that they come to slip on the road. This is the reason why the automobile comes uncontrolled or accidentally turn at the time of a sudden braking. In case of automobiles of front drive type, the front driving wheels braked by the engine are depressed to slip on the rode, because of the unbraked rear wheels, as is the case of a handcart, so that the front of the automobiles dives or the automobile becomes uncontrolled, often resulting in turning sideways.

Thus, in both cases, the steering stability of the automobile is deteriorated, due to the engine braking effect on the driving wheels, as compared with the normal cruising condition. Therefore, the automobile is likely to lose its steering stability, by the time when the brake pedal is depressed. However, unfortunately, the drive is not aware of this danger.

Under this circumstance, the described embodiment is intended for applying a braking torque only to the non-driving wheels, by means of the second braking apparatus 91, so as to correspond to the enging braking torque which is delivered only to the driving wheels, thereby to reduce the differential of the revolution speeds of the driving and the non-driving wheels, so that the above explained danger may be avoided.

In addition, since the braking effect appears at such an early stage as can never be expected in the conventional braking system, the stop distance can considerably be decreased. For instance, when the automobile is decelerated from a speed of 40 Km/h, the stop distance can be shortened by 2.2 m, supposing the braking effect is quickened by 0.2 second, which amounts more than 10% of the stop distance obtained by the conventional braking system, which is typically 18 m.

Figure 9:
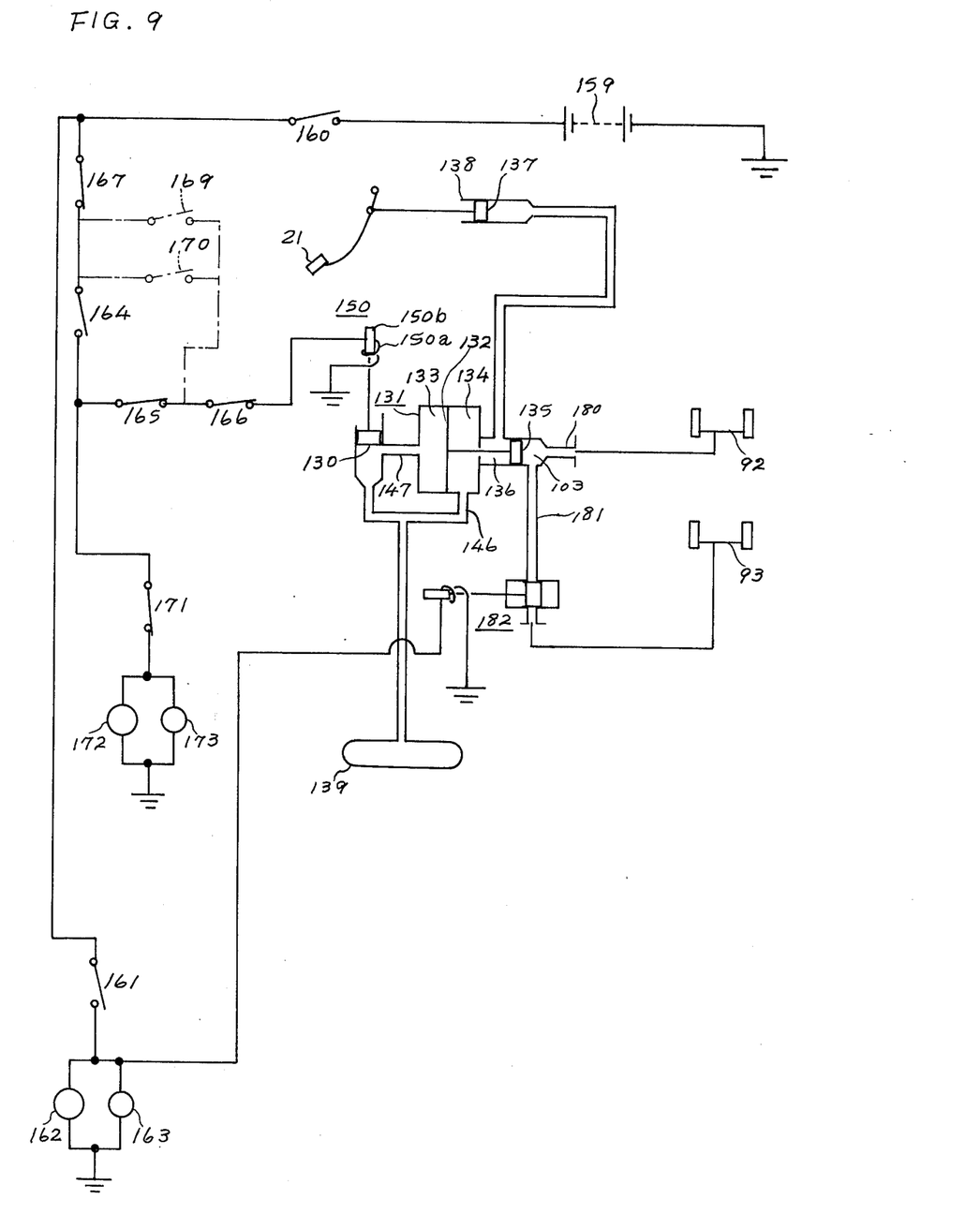

Referring now to FIG. 9 showing a still another embodiment of the invention, this embodiment is different from that of FIG. 5 only in that the connection to the braking apparatus is altered and that an electromagnet valve 182 is additionally provided. Therefore, in FIG. 9, parts corresponding to those of FIG. 5 are denoted by the same numerals. For the same reason, the following description of the operation of this embodiment does not include the part which is common to the embodiment of FIG. 5.

A braking apparatus 92 for non-driving wheels is connected to a connecting portion 180 of the high pressure chamber 103, while an electromagnet valve 182 and a braking apparatus 93 for the driving wheels are connected to a portion 181 of the high pressure chamber 103. The electromagnet valve 182 is adapted to close the passage normally, and opens the passage only when its coil is supplied with electric current. The coil is connected in series to the brake switch 161, so as to be in parallel with the stop lamp 162 and the warning lamp 163. Thus, the braking system of this embodiment functions in the same manner as that of FIG. 5, during the normal cruising and after the stopping, but in a quite different manner during the braking.

Namely, as the accelerator pedal 20 is abruptly released, the detecting switch 164 is closed to allow the energization of the coil 150a, so that the relay valve piston 130 is moved to bring the braking apparatus 92 for the non-driving wheels into effect, through the connecting portion 180. However, the brakeing apparatus 93 for the driving wheels is not actuated, because the electromagnet valve 182 is not energized to put the passage closed. Therefore, at the initial stage of the braking, the driving wheels are applied with only the engine braking torque. Then, as the accelerator pedal 20 has been returned to the non-depressed position, the braking appratus 92 for non-driving wheels id dismissed. The brake switch 161 is then closed by a subsequent depression of the brake pedal 21, so as to allow the energization of the coil of the electromagnet valve 182. Consequently, the braking effect is exerted equally on all wheel, in accordance with the depression amount of the brake pedal.

Conventionally, as mentioned before, the driving wheels are braked by the engine, while the non-driving wheels are left unbraked, soon after the release of the accelerator pedal 20, so that the automobile is likely to be rendered uncontrolled. However, according to the braking system of this embodiment, the non-driving wheels are suitably braked, so as to correspond to the driving wheels which are braked by the engine, thereby to ensure a safe braking at a high vehicle speed, as well as the improved steering stability at the sudden stop. Also, the stop distance can be considerably shortened.

Figure 10:
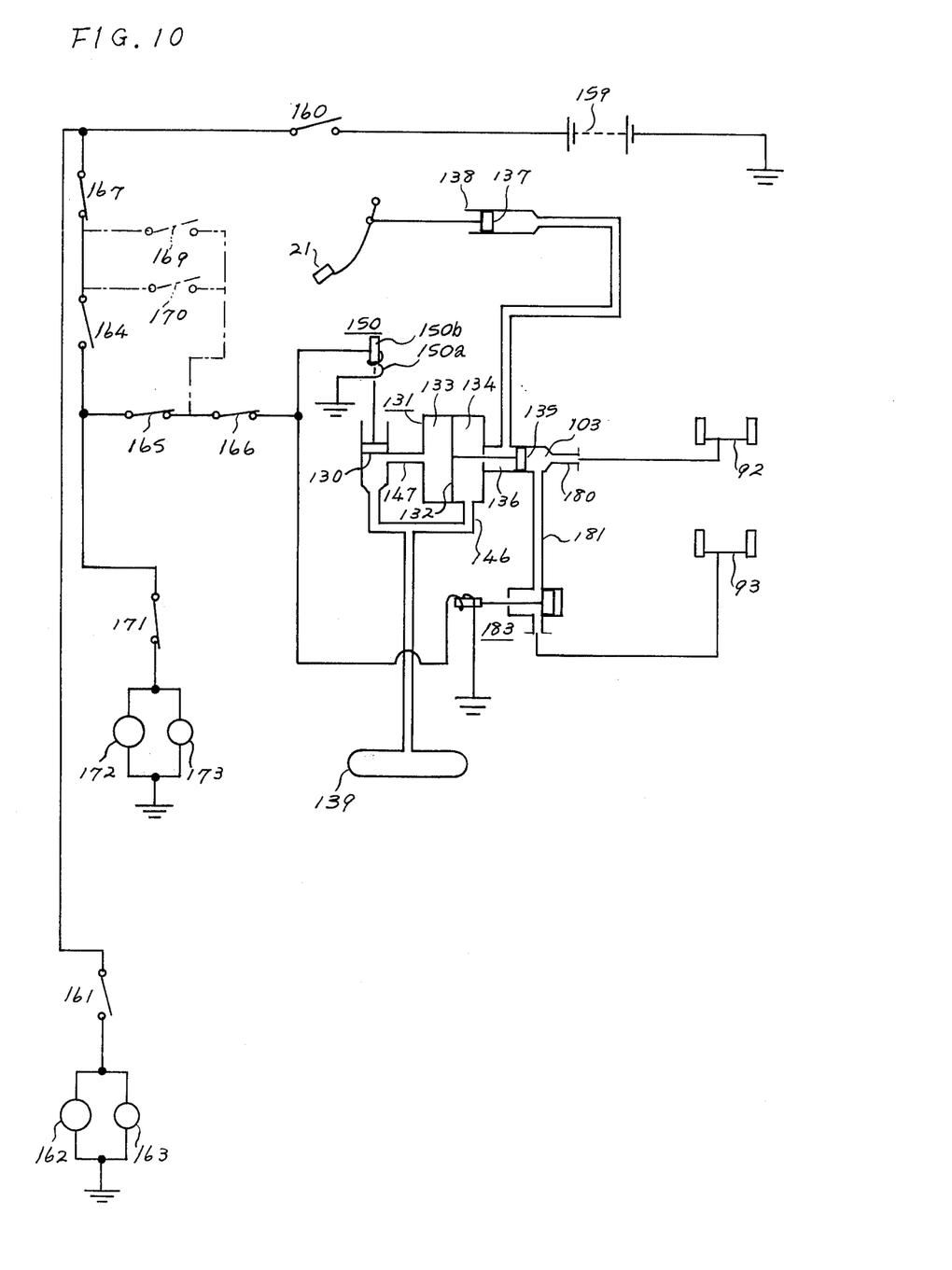

Referring now to still another embodiment as shown in FIG. 10, there is rpovided an electromagnet valve 183 adapted to close the passage when de-energized and connected in parallel with the coil of the solenoid 150. Other portions are similar to those of FIG. 9.

Thus, as the accelerator pedal 20 is abruptly returned, the detecting switch 164 is closed to allow the energization of the coil of the solenoid 150, as well as of the electromagnet valve 183. Consequently, the passage of the electromagnet valve 183 is closed to allow only the braking apparatus 92 for non-driving wheels to function, by the displacement of the relay piston valve 130. Then, as the accelerator pedal 20 is returned to the non-depressed position, the braking operation by the braking apparatus 92 is ceased and the passage of the electromagnet valve 183 is opened. Consequently, all wheels come under braking effect by the braking pedal, in accordance with the depression amount of the latter.

Namely, since the electromagnet valve 183 is normally kept opened, this embodiment is suitable for operating the braking pedal, while gently operating the accelerator pedal, i.e. for an abrupt deceleration or braking from a high speed. The embodiment of FIG. 10 thus ensures the same effect as the embodiment of FIG. 9.

Figure 11:
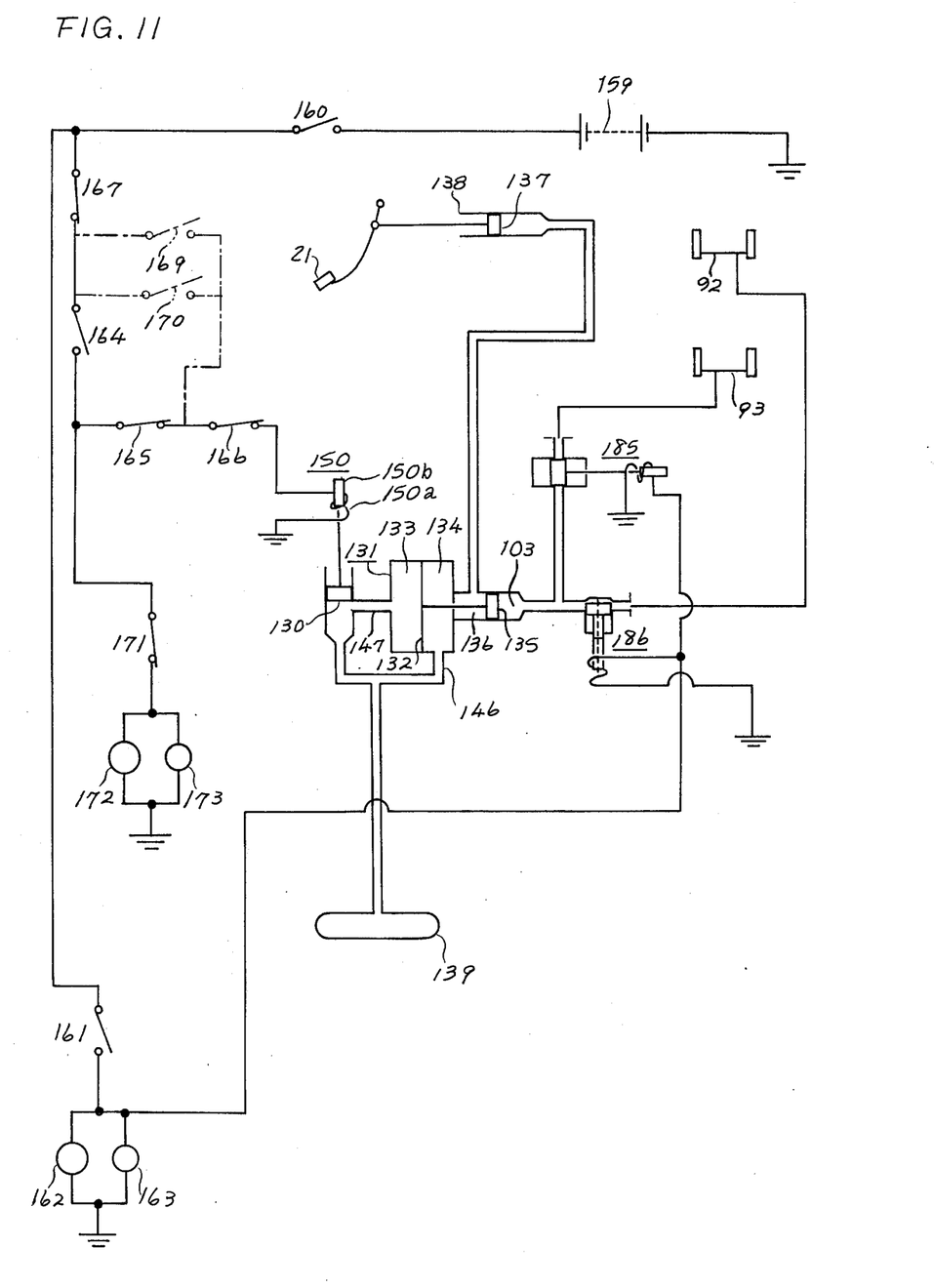

Referring now to still another embodiment of the invention as shown in FIG. 11, the construction is same as those of FIGS. 5 and 9, excepting an electromagnet valve connected to the high pressure chamber. More specifically, a normally closed electromagnet valve 185 is connected between the high pressure chamber 103 and the braking apparatus 93 for the driving wheels.

At the same time, a normally closed electromagnet valve 186 is connected between the high pressure chamber 103 and the braking apparatus 92 for non-driving wheels.

The coils of the electromagnet valves denoted at 185 and 186 are put in parallel with the stop lamp 162 and the like, and in series to the brake switch 161. Thus, the passages of both electromagnet valves are opened when the brake switch 161 is closed. The electromagnet valve 186 is designed to allow an adjustable amount of leak therethrough. Therefore, when the accelerator pedal 20 is abruptly retured, the detecting switch 164 is closed to allow the energization of the solenoid 150, and the braking apparatus 92 for non-driving wheels is operated gradually at a speed corresponding to the rate of leak allowed by the electromagnet valve 186.

Namely, by adjusting the clearance of the electromagnet valve 186, the non-driving wheels are gently braked in the manner as denoted by 27 in FIG. 3, so as to correspond to the driving wheels under the influence of the engine brake, avoiding the danger of control failure due to an abrupt braking.

The braking on the non-driving wheels is dismissed by the returning of the accelerator pedal 20 to the non-depressed position. A subsequent depression of the brake pedal 21 causes the brake switch 161 to close, so that the passages of the electromagnet valves denoted by the numerals 185 and 186 are opened to allow the braking on all wheels by the depression of the braking pedal 21, in accordance with the depression amount of the latter.

It will be seen that the construction of this embodiment is identical to that of FIG. 9, as far as the brake pedal 21 is depressed to open the electromagnet valves 185 and 186, promising the same effect. However, this embodiment provides an advantageous effect of rendering the operation of the braking apparatus gentle, at the biginning period of the braking operation.

Figure 12:
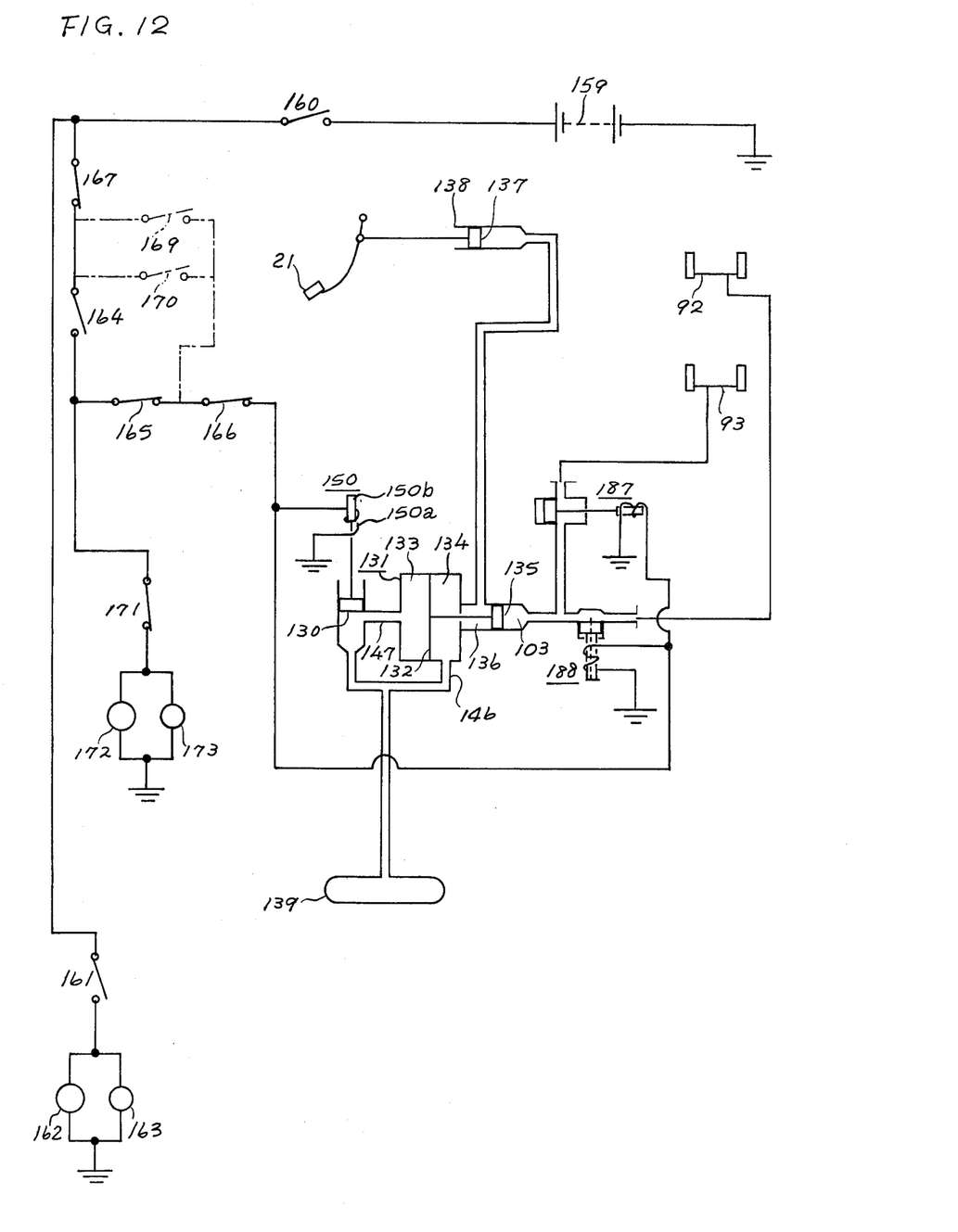

FIG. 12 shows still another embodiment which is same as those of FIGS. 5 and 11 excepting the arrangement of electromagnet valve connected to the high pressure chamber 103. More specifically, a normally-opened electromagnet valve 187 is connected between the high pressure chamber 103 and the braking apparatus 93 for the driving wheels, while another electromagnet valve 188 which is also of the normally-opened type is provided between the high pressure chamber 103 and the braking apparatus 92 for the non-driving wheels. The coils of these electromagnet valves are put in parallel with the solenoid coil 150a, so that the passages of these electromagnet valves 187 and 188 are closed when the solenoid 150 is energized. The electromagnet valve 188 is designed to allow an adjustable rate of leak therethrough. As the accelerator pedal 20 is abruptly returned, the detecting switch 164 is closed to allow the energization of the solenoid 150, as well as the electromagnet valves 187 and 188. Consequently, the passage of the electromagnet valve 187 is closed and the braking apparatus 92 for non-driving wheels comes gradually into effect at a rate corresponding to the rate of the leak through the electromagnet valve 188. Thus, by suitably adjusting the clearance of the electromagnet valve 188, it becomes possible to brake the non-driving wheels, gently as denoted by 27 in FIG. 3, corresponding to the engine braking force applied to the driving wheels, at the initial stage of the braking. This braking of the non-driving wheels at the initial stage is dismissed as the accelerator pedal 20 is returned to the non-depressed position. Consequently, the passages of the electromagnet valves 187 and 188 are fully opened to allow a braking force to be applied equally on all wheels, by the brake pedal 21 is depressed, and the magnitude of this braking force correspond to the depression amount of the brake pedal 21, as is in the foregoing embodiments.

It will be seen that the circuit structure of this embodiment is identical to that of FIG. 11, as far as the electromagnet valves 187 and 188 are kept closed, so that the braking effect at the initial stage of the braking is same as that of the embodiment of FIG. 11. Thus, this embodiment is suitable for gently operating the braking apparatus 92 for the non-driving wheels. At the same time, since the passage of the electromagnet valves 187 and 188 are kept opened in the normal state, this embodiment is suitable for operating the brake pedal 21, while gently operating the accelerator pedal 20, and, therefore, is suitable for use in abrupt braking at a high speed.

Figure 13:
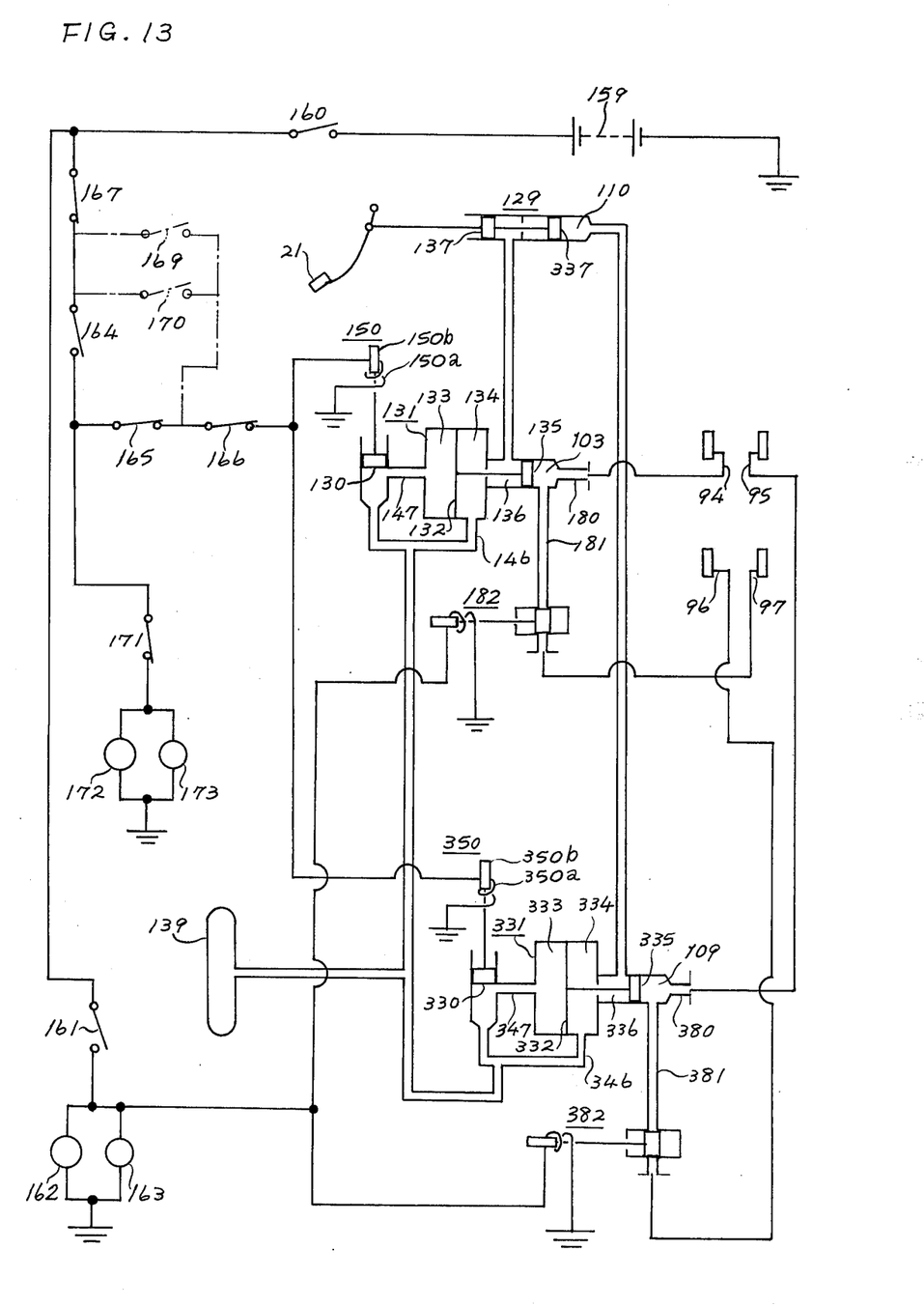

Referring now to FIG. 13 showing still another embodiment, a third braking force doubling mechanism is provided, which consists of parts identical to those in FIG. 9 designated at 130 to 136, 146, 147, 150, 180 to 182, and 103, respectively, so that these parts of third doubling mechanism are denoted by, respectively, 330 to 336, 346, 347, 350, 380 to 382, and 109. Concerning the other portions of FIG. 13, the parts in FIG. 9 connected to the braking apparatus 92 for the non-driving wheels are connected to a braking apparatus 94 for left-hand side non-driving wheel, and the parts in FIG. 9 connected to the braking apparatus 93 for the driving wheels are connected to a braking apparatus 97 for right-hand side non-driving wheel, in the embodiment shown in FIG. 13. Also, the master cylinder 138 in the embodiment of FIG. 9 is replaced with a tandem master cylinder 129 in which push rods 137 and 337 are installed.

The following description of the operation therefore does not include the operation of parts identical to those of FIG. 9 which are denoted by the same numerals and titles.

A third coil 350a is put in parallel with the coil 150a, while the coil of an electromagnet valve 382 is connected in parallel with that of the electromagnet valve 182. A third hydraulic control chamber 336 is connected to a chamber 110 of the tandem master cylinder 129, in which the push rod 337 acts. At the same time, the braking apparatus 95 for the right-hand side driving wheel is connected to a third connecting portion 380, while the braking apparatus 96 for the left-hand side driving wheel is connected to another third connecting portion 381, through the electromagnet valve 382.

In operation, as the accelerator pedal 20 is abruptly released, the detecting switch 164 is closed to allow the energization of the solenoid coil 150a and the third coil 350a. Consequently, the relay valve piston 130 and a third relay valve piston 330 are displaced, so that the braking apparatus 94 and 95 for the left and right-hand side non-driving wheels are independently actuated, through the connecting portion 180 and the third connecting portion 380, respectively. At this stage, the braking apparatus for the driving wheels are not actuated, because the electromagnet valves 182 and 382 are both closed, so that the driving wheels are applied with only the engine braking force. Then, the braking effort on the non-driving wheels is dismissed as the accelerator pedal 20 is returned to the non-depressed position. The brake switch 161 is then closed by the subsequent depression of the brake pedal 21, so that the electromagnet valves 182 and 382 are opened to cause a braking of all wheels at a rate corresponding to the depression amount of the brake pedal.

Thus, the function of this embodiment is identical to that of FIG. 9, but the embodiment of FIG. 13 provides a remarkable effect in case of a failure or trouble.

Namely, the braking system of FIG. 13 has a dual system, thanks to the provision of the first and the third braking force doubling mechanisms, which control the combination of left-hand side front wheel and right-hand side rear wheel, and right-hand side front wheel and left-hand side rear wheel, respectively. Thus, the embodiment of FIG. 13 has an increased safety over the embodiment of FIG. 9, because the braking function of one system is preserved safe, even when there is a trouble in the other system, to safely decelerate the automobile.

Figure 14:
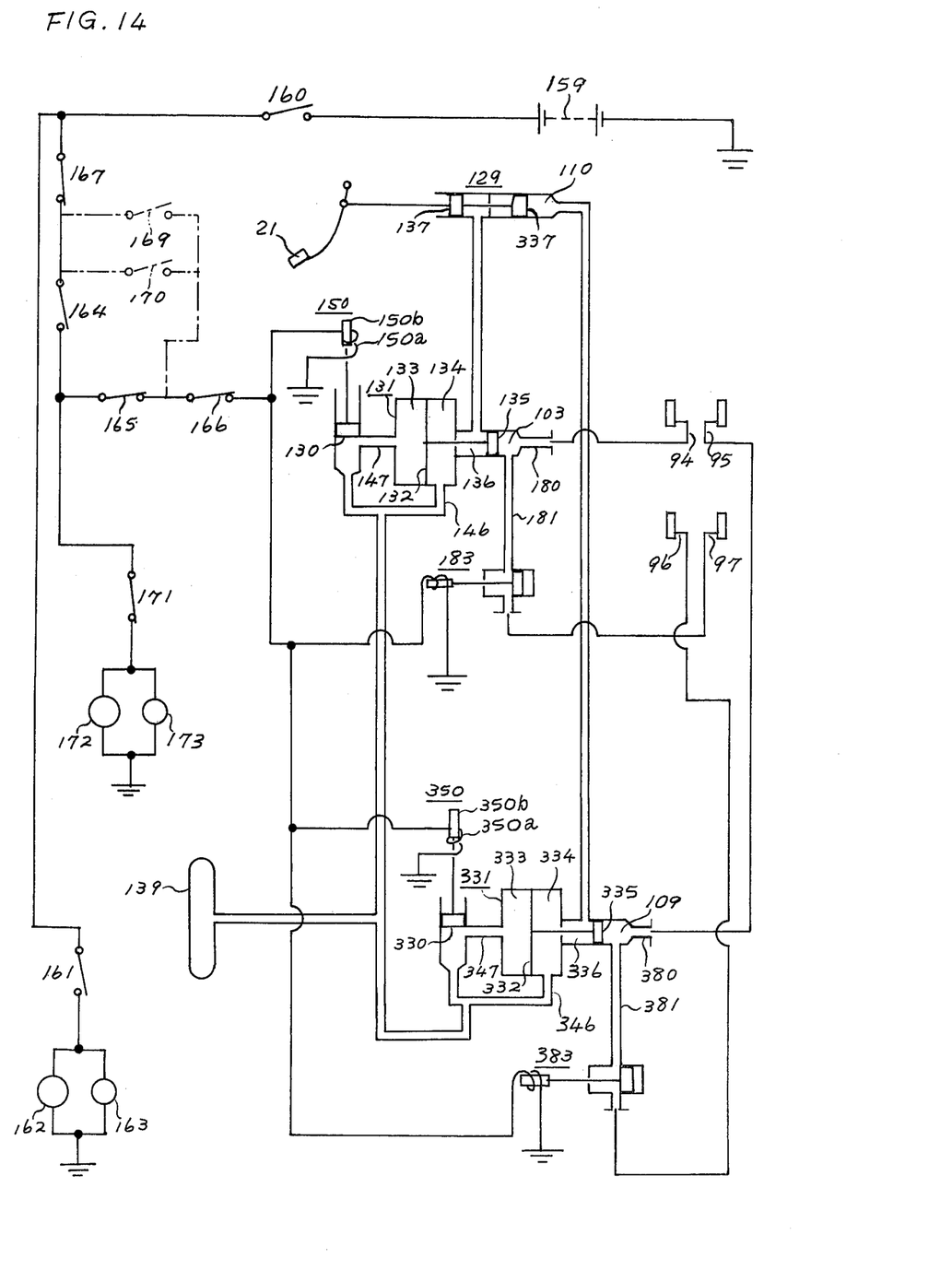

FIG. 14 shows still another embodiment in which the circuit structure is identical to that of the embodiment of FIG. 13, excepting the arrangement concerning the parts 183 and 383. Namely, the electro magnet valves 183 and 383 are held normally in the opened state and are closed when energized. The coils of these electromagnet valves are put in parallel with the coils of the solenoids 150 and 350. The construction of the system of FIG. 14 is identical to that of FIG. 10 excepting the provision of the third braking force doubling mechanism as illustrated at the right-hand side lower portion of the Figure and the manner of connection to the braking apparatus. Thus, in operation, the detecting switch 164 is closed as the accelerator pedal 20 is returned abruptly, so that the solenoids 150 and 350, as well as the electromagnet valves 183 and 383 are energized. Consequently, the passages of these electromagnet valves are closed to cause the movement of the relay valve piston 130 and the third relay valve piston 330, thereby to actuate the braking apparatus 94 and 95 for the left and right-hand side non-driving wheels, independently. At this stage, the braking apparatus for both driving wheels are not actuated, so that the driving wheel receives only the braking force provided by the resistance exerted by the engine, i.e. engine braking force. Then, as the accelerator pedal 20 is returned to the non-depressed position, the braking operation for the braking apparatus for non-driving wheels is dismissed, and the passages of the electromagnet valves 183 and 383 are opened. The brake pedal is then depressed to brake the all wheels by a force corresponding to the depression amount of the brake pedal 21.

Thus, the embodiment of FIG. 14 functions in the same manner as that of FIG. 10, except the case of trouble. Namely, thanks to the dual provision of the braking systems controlled by the first and the third braking force doubling mechanism, adapted for control the combinations of the left-hand side front wheel and the right-hand side rear wheel, and of the right-hand side front wheel and the left-hand side rear wheel, respectively, the braking performance is preserved by at least one braking sustem, even if the other system fails to work. The braking system of FIG. 14 is therefore more reliable than that of FIG. 10.

Referring now to still another embodiment, the advantageous effect brought about by the electromagnet valve 186 of FIG. 11 is combined with the circuit structure of FIG. 13. More specifically, turning again to FIG. 13, the connection of the high pressure chamber 103 with the braking apparatus 94 for the left-hand side non-driving wheel is substituted by a connection of the high pressure chamber 103 with the normally closed electromagnet valve 186 adapted to allow a leak and the braking apparatus 94 for the left-hand side non-driving wheel. Also, the connection in FIG. 13 between the third high pressure chamber 109 and the braking apparatus 95 for the right hand side non-driving wheel is made through a normally closed electromagnet valve (supposed here to be 186a) adapted to allow a leak similarly to the electromagnet valve 186. The coils of these electromagnet valves 186 and 186a are put in parallel with the stop lamp 162. The passages of the electromagnet valves 186 and 186a are adapted to be opened when these coils are energized. The electromagnet valves can be adjusted to allow the leak at a desired rate at their closing condition. Other parts are identical to those of FIG. 13.

Therefore, a gentle braking operation can be expected at the beginning period of the braking, as is the case of FIG. 11, and the advantage of the improved reliability of the embodiment of FIG. 13 is also ensured. More specifically, since this embodiment has a dual system consisting of two systems, one for front left and right rear wheels while the other is for front right and rear left, either one system can perform the braking function even when the other system happens to fail. Thus, this embodiment has an improved reliability, over that of FIG. 11, as expected in the embodiment of FIG. 13.

In still another embodiment described hereinafter, the advantage brought about by the electromagnet valve 188 of FIG. 12 is combined with the circuit structure of FIG. 14. Namely, the combination in FIG. 14 of the high pressure chamber 103 with the braking apparatus 94 of the left-hand side non-driving wheel is substituted by a combination of the high pressure chamber 103 with a normally opened electromagnet valve 188 and the braking apparatus 94 for the left-hand side non-driving wheel. Also, the connection in FIG. 14 between the third high pressure chamber 109 and the braking apparatus 95 for the right-hand side non-driving wheel is substituted by a connection of the same chamber 109 with the same braking apparatus 95 through a normally opened electromagnet valve (supposed here to be 188a). The coils of these electromagnet valves 188 and 188a are put in parallel with the solenoid coil 150a, so that the electromagnet valves 188 and 188a are closed to allow certain leakage therehtrough, respectively, when their coils are elergized. The rate of the leak is adjustable for respective electromagnet valves. Other portions than mentioned above are identical to those of the embodiment of FIG. 14.

Since the electromagnet valves 188 and 188a, as well as the electromagnet valves 183 and 383, are opened in the usual state, this embodiment is suitable for operating the brake pedal 21 while gently operating the accelerator pedal 20 and, therefore, is suitable for an abrupt deceleration at a high speed. At the beginning period of the braking, a gentle braking effect is provided by the closure of the electromagnet valves 188 and 188a which allow limited leaks, respectively, so as to ensure the same advantageous effect at that performed by the embodiment of FIG. 12. In addition, this embodiment can function in the similar manner as the embodiment of FIG. 14 in case of a failure in either one system, promising an improved safety and reliability.

It will be seen from the foregoing description that the non-driving wheels are braked in response to an abrupt returning motion of the accelerator pedal, at such an early stage as could never be expected in the conventional braking system, in advance to the depression of the brake pedal, so that the non-driving wheel can well correspond to the driving wheels which are braked by the engine, at the beginning period of the braking operation. Consequently, a double effect of improved steering stability at the beginning period of braking and the shortened stop distance can be provided by the braking system in accordance with the invention.

Having described the invention through preferred embodiment, it is to be noted here that these embodiments have been shown in their ideal forms, and various changes and modifications may be imparted thereto without substantially departing from the spirit and scope of the invention which are delimited solely by the appended claims.

I claim:

1. A braking system for an automobile braking apparatus having first and second braking force doubling mechanisms including a solenoid coil in series with first and second switch means and an electric power source, said first switch means adapted to be closed by depression of an accelerator pedal and opened when said accelerator pedal has returned to a non-depressed position said second switch means having a detecting switch (164) adapted to be closed in response to an abrupt or quick returning motion of said accelerator pedal of said automobile, wherein said first braking force doubling mechanism comprises:
   (a) a body having a large chamber (131) and a small chamber (102) connected to each other;
   (b) a power piston (132) movably housed in said large chamber so as to divide the space in said large chamber into a first controlling chamber (133) and a vacuum chamber (134);
   (c) a communication port in said vacuum chamber for communication with a vacuum source;
   (d) a hydraulic piston (135) operatively coupled to be actuated by said power piston and accommodated by said small chamber, so as to divide the space in said small chamber into a hydraulic controlling chamber and a high pressure chamber (103), said high pressure chamber having a port for communication with said braking apparatus;
   (e) a relay valve cylinder connected at one end to the atmosphere and at the other end to said vacuum source, and having a communication port opening in said first controlling chamber (134);
   (f) a relay valve piston (130) adapted to be actuated by a brake pedal of said automobile and housed by said relay valve cylinder for selectively bringing said communication port of said relay valve cylinder into communication with the atmosphere side and the vacuum side;
   (g) solenoid means for electrically actuating said relay valve piston; and,
   (h) connecting means for connecting said relay valve piston (130) to the core of said solenoid means, said vacuum chamber being in communication with said vacuum source, said high pressure chamber (103) being connected to braking apparatus of said automobile, sand said relay valve piston being connected to said brake pedal to be actuated by the latter.

2. A braking system as claimed in claim 1, wherein said second switch means are so constructed as not to be closed when said accelerator pedal is returned slowly.

3. A braking system as claimed in claim 1, wherein said solenoid means for actuating said relay valve piston has means for restricting the stroke or travel distance, whereby air is gradually introduced into said relay valve cylinder, when said solenoid means are energized, so as to gradually increase the braking force.

4. A braking system as claimed in claim 1, wherein a third switch means and warning means are connected in series to said second switch means and said power source which are connected in series, said third switch means being adapted to be opened by a depression of said brake pedal and closed, whereby said warning means are enrgized to inform the following automobile of the braking, during a period until said brake pedal is depressed from an instant of said abrupt returning of said accelerator pedal, by the closure of said second and third switch means.

5. A braking system as claimed in claim 1, wherein a fourth switch means is connected in series to said coil of said solenoid, said second switch means and said power source which are connected in series, said fourth switch means being adapted to be opened by a depression of a clutch pedal of said automobile and closed to allow an electric current to pass therethrough by the returning of said clutch pedal.

6. A braking system as claimed in claim 1, wherein said high pressure chamber (103) is connected to a second braking apparatus (91) for non-driving wheels, and wherein a second braking system (140) is provided for cooperating with said second braking apparatus, said braking apparatus being adapted to act on all wheels in response to a depression of said brake pedal.

7. A braking system as claimed in claim 1, wherein said high pressure chamber (103) is connected to a braking apparatus (92) for non-driving wheels, and said high pressure chamber is further connected to a braking apparatus (93) for driving wheel through a normally closed electromagnet valve (182), said electromagnet valve being adapted to open a fluid passage between said high pressure chamber and said braking apparatus for driving wheels when its solenoid coil is energized, said solenoid coil being connected in series to a brake switch (161) and in parallel with stop lamp.

8. A braking system as claimed in claim 1, wherein said high pressure chamber is connected to a braking apparatus (92) for non-driving wheels, and wherein said high pressure chamber is further connected to a braking apparatus (93) for driving wheels through a normally opened electromagnet valve (183), said electromagnet valve being adapted to close a fluid passage between said high pressure chamber and said braking apparatus for said driving wheels when its coil is energized, said coil being connected in parallel with the coil of said solenoid means (150).

9. A braking system as claimed in claim 1, wherein said high pressure chamber (103) is connected to a braking apparatus (93) for driving wheels through a normally closed electromagnet valve (185), and to a braking apparatus (92) for non-driving wheels through a normally closed electromagnet valve (186) adapted to normally allow a certain leak therethrough, said electromagnets being adapted to open respective passages when their coils are energized, said coils being connected in series to a brake switch so as to form circuits in parallel with stop lamp.

10. A braking system as claimed in claim 9, wherein said normally closed electromagnet valve (186) is adapted to allow said leak at an adjustable rate and to be fixed to afford an adjusted rate of said leak, so that the non-driving wheels may be braked gently at an adjustable retarding rate when said solenoid means are actuated.

11. A braking system as claimed in claim 1, wherein said high pressure chamber (103) is connected to a braking apparatus (93) for driving wheels through a normally opened electromagnet valve (187), and to a braking apparatus (92) for non-driving wheels through another normally opened electromagnet valve (188), said electromagnet valves being connected in parallel with the coil of said solenoid means and adapted to close respective fluid passages when their coils are energized, but said electromagnet valve (188) allowing a slight leak therethrough in the closing state.

12. A braking system as claimed in claim 11, wherein said normally opened electromagnet valve (188) is adapted to close, when its coil is energized, allowing an adjustable rate of said leak, and to be fixed to afford an adjusted rate of leak, so that the non-driving wheels are gently braked at an adjustable retarding rate.

13. A braking system as claimed in claim 1, wherein said high pressure chamber (103) is connected to a braking apparatus (94) for left-hand side non-driving wheel, and to a braking apparatus (97) for right-hand side driving wheel through a normally closed first electromagnet valve (182), and, including a third braking force doubling mechanism having a third high pressure chamber (109), a right-hand braking and a a left-hand braking apparatus (95, 96), and a second electromagnetic valve (382), said third high pressure chamber being connected to said braking apparatus (95) for right-hand side non-driving wheel and to said braking apparatus (96) for left-hand side driving wheel through said normally closed second electromagnet valve (382), and a third solenoid means (350) with a coil connected in parallel with the coil of said solenoid means (150), said first and second electromagnet valves (182, 382) being adapted to open respective fluid passages when their coils are energized, a brake switch (161), said coils being connected in series to said brake switch (161) so as to form circuits in parallel with a stop lamp.

14. A braking system as claimed in claim 1, wherein said high pressure chamber (103) is connected to a left-side first braking apparatus (94) for left-hand side non-driving wheel, and to a braking apparatus (97) through a normally opened first electromagnet valve (183), that a third braking force doubling mechanism having the same construction and equipped with a third high pressure chamber (109) is provided, said third high pressure chamber being connected to a right-side braking apparatus (95) for right-hand side non-driving wheel and to a left-side second braking apparatus (96) for left-hand side driving wheel through a normally opened electromagnet valve (383), said electromagnet valves (183) and (383) being adapted to close respective passages when their coils are energized, and that the coil of a third solenoid means (350) and the coils of said electromagnet valves (183, 383) ae connected in parallel with the coil of said solenoid means (150).

15. A braking system as claimed in claim 1, wherein a third braking force doubling mechanism having the same construction with said first doubling mechanism and equipped with a third high pressure chamber (109), wherein said high pressure chamber (103) is connected to a braking apparatus (97) for right-hand side driving wheel through a normally closed electromagnet valve (182), and to a braking apparatus (94) for left-hand side non-driving wheel through a normally closed electromagnet valve (186), while said third high pressure chamber (109) of said third doubling mechanism is connected to a braking apparatus (96) for left-hand side driving wheel through a normally closed electromagnet valve (382), and to a braking apparatus (95) for right-hand side non-driving wheel through a normally closed electromagnet valve (186a) adapted to normally allow a leak therethrough, the coil of said solenoid means 150 being connected in parallel with a coil of a third solenoid (350), said electromagnet valves (182, 382, 186) and (186a) being adapted to open respective fluid passages when their coils are energized, said coils of said electromagnet valves being connected in series to a brake switch (161), so as to be in parallel with a stop lamp.

16. A braking system as claimed in claim 1, wherein a third braking force doubling mechanism having the same construction with said first doubling mechanism and provided with a third high pressure chamber (109), wherein said high pressure chamber (103) is connected to a braking apparatus (97) for right-hand side driving wheel through a normally opened electromagnet valve (183), and to a braking apparatus (94) for left-hand side non-driving wheel through a normally opened electromagnet valve (188), while said third high pressure chamber is connected to a braking apparatus (96) for left-hand side driving wheel through a normally opened electromagnet valve (383), and to a braking apparatus (95) for right-hand side non-driving wheel through a normally opened electromagnet valve (188a), said electromagnet valve (183, 383, 188) and (188a) are adapted to close respective fluid passages when their coils are energized, said electromagnet valves (188, 188a) being adapted to allow leak therethrough in their closing states, said coils of said four electromagnet valves and a coil of a third solenoid means are connected in parallel with the coil of said solenoid means.

17. A braking system as claimed in claim 16, wherein said electromagnet valve (186a) is of the normally closed type designed to normally allow a leak of an adjustable rate, and is constructed to afford an adjusted rate of said leak, so that the non-driving wheels may be gently braked at an adjustable rate when said third solenoid means (350) are actuated.

18. A braking device as claimed in claim 17, wherein said electromagnet valve (188a) is adapted to close its fluid passage allowing a leak therethrough when its coil is energized and is designed and constructed to be fixed to afford an adjusted rate of said leak, so that the non-driving wheels may be gently braked at an adjusted rate.

* * * * *